United States Patent [19]

Carlsson et al.

[11] 3,871,901
[45] Mar. 18, 1975

[54] PHOTOSTABILIZATION OF POLYMERS
[75] Inventors: David J. Carlsson; Tony Suprunchuk; David M. Wiles, all of Ottawa, Ontario, Canada
[73] Assignee: Canadian Patents and Development Limited, Ottawa, Ontario, Canada
[22] Filed: June 29, 1972
[21] Appl. No.: 267,461

[30] Foreign Application Priority Data
July 2, 1971   Canada .............................. 117203

[52] U.S. Cl. ............. 117/47 A, 117/93.31, 117/118, 117/138.8 R, 260/2 EN, 260/2 M, 260/439
[51] Int. Cl. ........................ B44d 1/32, B44d 1/092
[58] Field of Search ...... 117/47, 93.31 DF, 138.8 R, 117/118; 260/2 M, 2 EN, 439

[56]     References Cited
UNITED STATES PATENTS
3,677,763   7/1972   DeBoer et al .................... 117/93.31

Primary Examiner—William R. Trenor
Attorney, Agent, or Firm—Mason, Fenwick & Lawrence

[57]     ABSTRACT

Articles of polymers susceptible to degradative attack by ultraviolet radiation are stabilised by the application of a very thin continuous layer of an energy transfer agent which does not significantly absorb radiation in the ultraviolet region of the spectrum. The energy transfer agent should be a metal coordination compound containing a metal atom, and a ligand either having as electron donor atom or atoms, one or more nitrogen, oxygen or sulfur atoms, or comprising a cyclic olefin; or a substituted phenol, and the agent is used in amounts of at most 0.5% by weight based on the weight of the polymeric substrate.

The stabilised articles demonstrate prolonged resistance to ultraviolet degradation.

24 Claims, 1 Drawing Figure

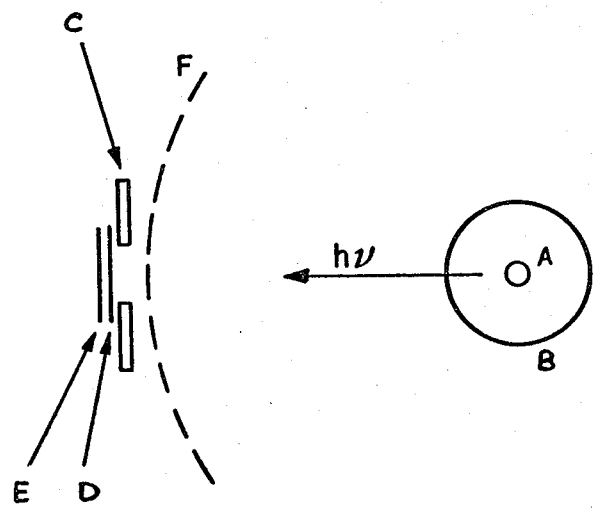

PHOTOSTABILIZATION OF POLYMERS

This invention relates to polymeric articles stabilised against the degradative effects of actinic radiation, particularly ultraviolet radiation, and to their preparation.

Most commercial polymers (including polyolefins, polyesters, polyamides, polystyrene, acrylate and alkyl acrylate polymers and polymers of other ethylenically unsaturated monomers, and cellulosics) suffer from irreversible damage when exposed to actinic radiation. Thus exposure to such radiation can cause fading, discolouration, changes in light transmission and changes in mechanical properties. The most damaging radiation is that in the ultraviolet region of the electromagnetic spectrum. This region lies next to, and is of shorter wavelength than, the visible region. It is normally considered to occupy the range of wavelengths from about 50 A to about 4,000 A. Ultraviolet radiation of wavelength about 3,000 A to 4,000 A, the "near region," is present in sunlight (the shorter wavelengths are cut out by the Earth's atmosphere). Other sources of such radiation are carbon arc and gas discharge lamps. The incidence of such radiation on polymeric articles can cause undesirable photochemical reactions, such as decompositions, rearrangements and oxidations, which results in the undesirable changes in physical properties referred to above. These changes are frequently caused by the presence of impurities since polymers, for example polyolefins, many vinyl polymers and polyamides, theoretically should not absorb ultraviolet radiation when pure. For example, in the case of polyolefins it is the impurities which are formed during processing, such as ketonic, aldehydic or peroxidic substances, which are the light sensitive species (chromophores). It is the absorption of light by these chromophores to give energetically excited species which leads to the onset of photo-induced degradation since decomposition of the excited species causes chain scission and initiates oxidative attack.

Hitherto, polymeric materials have been protected against the degradative effects of ultraviolet light by the use of a wide variety of stabilisers. One class of stabilisers, the "absorbers," protect the polymer by screening the polymer from incident light of harmful wavelength. Such stabilisers are required to absorb strongly light in the ultraviolet region, especially the "near region". They preferably should also be transparent to light in the visible region, stable to light and heat, and compatible with the polymer and any compounding ingredients it may contain, for example, antioxidants.

Although compounds have been prepared for use as absorbers which satisfy these criteria, they have, in general, to be used in relatively high concentrations if they are to provide adequate protection. Increasing the concentration of an absorber may cause problems of compatibility with a substrate and can detract from the properties, such as the colour, clarity and tensile properties, of a substrate. Furthermore, the absorbers are usually uniformly distributed throughout the substrate polymer and, as attenuation of the ultraviolet radiation increases exponentially as the distance from the surface increases, extensive surface deterioration is not prevented by the use of this type of stabiliser. Such a disadvantage is particularly noticeable in thin articles which have a high surface area in relation to their volume, so that thin articles, such as films or textile fibres, are at best only partially protected against degradation by ultraviolet radiation. For example, conventional absorbers have been found to offer little protection to polypropylene monofilaments of < 50 microns diameter (Textile Research Journal 39 (1969), pages 243 – 247). It has, furthermore, been found that the actinic deterioration of polypropylene films is initiated by the photo-oxidation of surface impurities or chromophores, which gives rise to extensive surface deterioration and consequent loss of physical properties during ultraviolet irradiation (D. J. Carlsson and D. M. Wiles, Journal of Polymer Science, Polymer Letters 8B, page 419, 1970). The chromophores are present in a very thin layer (of the order of a few hundred Angstroms) on the surface of the film so that stabilisation of such thin extruded articles as films (less than $50\mu$ in thickness) by the uniform distribution of ultraviolet absorbers is ineffective except at impractically high concentrations.

Similar considerations apply to other polymeric substrates. In the case of polymers which inherently absorb a high proportion of radiation in the near ultraviolet region, such as aromatic polyamides, polycarbonates and aromatic polyesters, degradation takes place in only a thin surface layer since extinction of the incident radiation occurs in this layer. In addition, opaque, filled, pigmented or dyed polymers scatter and absorb incident radiation and undergo degradation only in a surface layer.

One way out of this difficulty which has been suggested is the provision of a layer of the absorber between the polymeric substrate and the source of actinic radiation. However, this requires the application of a relatively thick layer if the absorber is to be effective since the layer is required to screen out all of the wavelengths to which the substrate is sensitive. This can be accomplished by incorporating the absorber in a polymer composition which is coated onto the substrate.

This solution to the problem is not entirely satisfactory since few compounds are capable of providing a coating layer which is compatible with the substrate so that the coating does not tend to break away from the substrate.

Another class of stabilisers can provide protection against ultraviolet radiation. These are compounds which do not absorb a significant proportion of incident ultraviolet radiation and are known as "energy transfer agents". Although the precise mechanism by which they act as stabilisers is not yet fully understood they appear to function by accepting energy from chromophores in the polymer which have themselves already accepted energy from the incident ultraviolet radiation. This means that the chromophores, which would otherwise be responsible for the chemical reactions and associated degradative effects referred to above, are deactivated and the polymer is stabilised. The transfer of energy between the stabiliser and the chromosphere, which takes place at an energy level of the stabiliser (frequently triplet) close to and just below the energy level of the activated chromophore, may involve collision or may even occur over distances greater than the collision diameters, for example up to 50A or perhaps even greater. It can be seen from this that the energy transfer type of stabilisers protect by accepting or "quenching" the radiation energy absorbed by chromophores whereas the absorber type of stabilisers protect by preventing the radiation energy from reaching the chromophores.

When energy transfer agents are blended intimately with a polymeric substrate there can be similar disadvantages to those attendant upon the use of absorbers, namely lack of compatibility and adverse effect on the properties of the substrate.

We have now found in accordance with the invention that articles comprising a polymeric substrate can be stabilised against the degradative effects of ultraviolet radiation by distributing through substantially only a continuous thin surface layer of the substrate, an energy transfer agent which is a metal coordination compound containing at least one metal atom and a ligand in which the electron donor atom or atoms is or are nitrogen, oxygen or sulfur or which is a cyclic olefin.

Preferably, the polymeric substrate has a maximum thickness of about 50 microns and the amount of energy transfer agent in the substrate surface layer is at most about 0.5% by weight based on the weight of the polymeric substrate.

The invention makes possible effective stabilisation at, for example, loadings of energy transfer agent as low as 0.001% by weight on substrates such as films or fibres of thickness 20µ.

Since energy transfer agents should be located close to the chromophores if they are to be effective (probably within about 50 A) and the important chromophores are present in a thin surface layer, it is not necessary to distribute the energy transfer agents throughout the cross-section of the articles. The surface application of the stabiliser requires less material than does uniform distribution throughout the article without an appreciable sacrifice in the stability of the article to ultraviolet radiation. In this connection it should be appreciated that the surface of the polymeric substrate to which the surface layer of the energy transfer agent is applied has numerous physical irregularities resulting from processing and should properly be considered to be a layer of several hundred Angstroms thickness. This should be taken into account when reference is made in this specification to the application of the layer of stabiliser to the surface of a substrate.

The energy transfer agents which are used in accordance with the invention may be differentiated from ultraviolet absorbers by means of a relatively simple test. This test is illustrated by the accompanying drawing which shows samples arranged inside a carbon arc "Fade-Ometer" (Registered Trade Mark). Radiation from an arc A passes through a borosilicate glass globe B and falls on a first film D which is mounted in a metal frame C on a rotating drum F of the machine. The test measures the ability of an ultraviolet stabiliser, which has been incorporated in or on film D, to protect a second film E mounted directly behind film D from the radiation from arc A. Film E contains no ultraviolet stabiliser, and is mounted so as to receive only radiation which has passed through film D. The film E will usually degrade almost as rapidly (within 10–20%) behind a film D which has been stabilised with an energy transfer agent as it will when irradiated directly, that is without film D. Film E will, however, have a significantly reduced degradation rate if film D is protected with an ultraviolet absorber and will have a lifetime close to, or slightly greater than that of Film D. An obvious prerequisite for this test is a high inherent transmission of the incident radiation by the unstabilised polymer films. Some energy transfer agents may show a small absorption of the ultraviolet radiation, which could contribute to the stabilisation effect but only when used at concentrations appreciably in excess of those required for adequate protection by the energy transfer mechanism.

The energy transfer agents used in accordance with the invention fall into two main classes, namely the metal coordination compounds and the substituted phenolic organic compounds. Although many metal salts promote rather than suppress photo-oxidations, various coordination compounds can act as efficient energy transfer agents. The coordination compounds are formed between a metal atom and an electron donor. The electron donor is frequently known as a ligand, and must possess at least one pair of electrons that it can donate to the metal ion. If a ligand possesses two or more electron donor groups which form coordinate bonds with a metal atom, the resulting cyclic structure is known as a metal chelate, and the ligand is known as a chelating agent. Many metal ions can form complexes or chelates, but only certain atoms present in the ligands are capable of donating electrons and are nitrogen, oxygen or sulfur atoms in the energy transfer agents used in accordance with the invention.

Several examples of metal chelates which can operate as energy transfer agents have been described in the literature. P. J. Briggs and J. F. McKellar [J. Applied Polymer Sci. 12, 1825 (1968)] have taught that certain nickel (II) complexes of oximes, or various nickel (II) complexes of 2-hydroxyphenyl aldimines, 2-hydroxyphenyl ketimines or 2-aminophenyl aldimines accept excitation energy from anthracene. J. C. Chien and W. P. Conner [J. Amer. Chem Soc., 90, 101 (1968)] have also taught that nickel (II) complexes inhibit photo-oxidations in the liquid phase by an energy mechanism, rather than solely by screening. Coordination complexes which we have found to pass the stabiliser screening test described above, when blended with polypropylene, include nickel (II) complexes with ligands such as glyoxime, dimethylglyoxime, furil dioxime, 1,2-cyclohexane-dione dioxime, 2,2'-dihydroxyphenyl sulphide, 2,2'-thiobis(4-tert-octylphenol), n-butylamine, 2-hydroxy-5-methoxyphenyl N-(n-butyl) aldimine, 2-hydroxy-1-naphthyl N-(n-butyl) aldimine and cyclopentadiene. Preferred energy transfer agents of the metal coordination compound type therefore are nickel compounds containing a group of the formula:

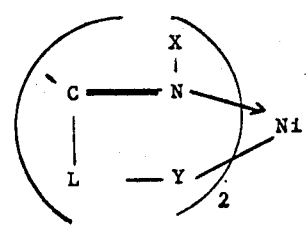

wherein X is a hydroxyl group or a hydrocarbyl group, Y is —NH, —O— or —NOH, and L is a linking moiety; or a grouping of the formula:

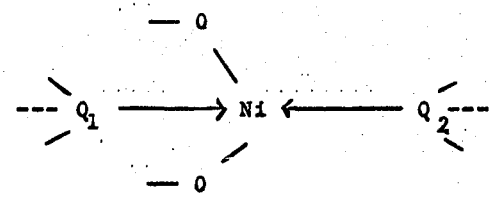

wherein $Q_1$ and $Q_2$ may be the same or different and are each S or N; or a grouping of the formula $R_1—Ni—R_2$, wherein $R_1$ and $R_2$ each represent a cyclic olefin group, such as cyclopentadiene, cyclohexa-1,3-diene, cyclohexa-1,4-diene, cycloocta-1 5-diene, cycloocta-1,3,5-triene, cyclooctatetraene, cyclododeca-1,5,9-triene, or a derivative thereof. These compounds are preferably used in an amount of from 0.01% to 003% by weight.

Organic compounds which we have found to pass the stabiliser screening test described above, when blended with polypropylene, include 2-hydroxy-4-dodecyloxy-benzophenone and octadecyl 3-(3',5'-di tert-butyl-4'-hydroxyphenyl) propionate and preferred such compounds are of the formula:

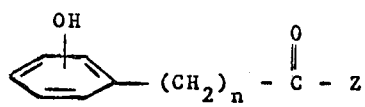

wherein $n$ is 0 or an integer from 1 to 6, and Z is a group —R or —OR wherein R is a hydrocarbyl group, or a derivative of such a compound in which the benzene ring is substituted by one or more hydroxyl, nitro, halogen, —R or —OR substituents. These compounds are preferably used in an amount of from 0.03 to 0.4% by weight. Typical groups which can be represented by R are aryl, alkyl, aralkyl and alkenyl in which the alkyl or alkenyl moieties preferably have at most six carbon atoms.

Certain of the energy transfer agents, in particular the metal coordination compounds, also provide excellent dye receptor sites. Under suitable conditions, the presence of the stabilizers on the surface facilitates very rapid dyeing to intense shades and requires less dye. Polyolefins, in particular, have proven difficult to dye, and the double-barrelled advantages of ultraviolet stabilisation and enhanced dyeability both provided by one surface additive have made this aspect of the invention particularly attractive. The articles which are stabilized in accordance with the invention preferably have a high ratio of surface area to volume such as individual filaments, fibres or films having a thickness of up to about 50 microns as used, for example, in composite films, fibres and woven or felted fabrics.

The energy transfer agent should be present at the surface of a substrate as a thin substantially continuous layer. The formation of this layer may be achieved in a number of ways. For example, the layer may be formed during fabrication of an article by:

1. conjugate extrusion of a thin, fully stabilised polymeric layer on the surface of an unstabilised or partially stabilised core which forms the substrate; or
2. adjustment of the melt properties and stabiliser mobility such that the stabiliser preferentially migrates to the surface during extrusion.

Alternatively, the stabiliser may be added to a preformed article by, for example:

3. deposition of the stabiliser, for example, by sublimation, as an extremely thin continuous layer which is in molecular contact with the surface of the article; or
4. diffusion of the stabiliser into the preformed articles from a solution, so that add-on is confined to the surface layer of the article.

In order to achieve a satisfactory bond between the substrate and the layer of energy transfer agent, it is preferred that the surface of the substrate should be activated (before or after deposition of the energy transfer agent) by a suitable treatment, for example, by exposure to an electrical discharge or by a flame or chemical treatment. Thus, for example, a stabiliser may be sublimed onto a substrate in the presence of a glow discharge, or the surface may be exposed to a corona discharge or treated chemically and the stabiliser then sublimed onto the treated surface. The methods (3) and (4) may be used for the application of stabilisers which cannot withstand the temperatures involved in extrusion, for example, about 250°C. In these methods the stabiliser may be applied in the form of a precursor, e.g., a nickel-free precursor, which is subsequently converted into the stabiliser by treatment with a suitable reagent, e.g., a nickel salt. This procedure can be used with advantage when the stabilizer is of low solubility or volatility.

The application of a stabiliser by method (3) may be effected by sublimation of the stabiliser (or suitable precursor) at low pressure (1–10 torr) onto the article. The techniques for the operation of continuous flow lines through reduced vacuum regions have been described in U.S. Pat. No. 3,179,482, and by W. R. R. Park in "Plastics Film Technology" Ch.6, published by Van Nostrand Reinhold Co., New York (1969). The cost of the increased mechanisation required for the coating step may be partially offset by the absence of blending machinery required to produce a homogeneous distribution of the stabiliser in blended resins.

Loss of stabiliser by volatilisation, extraction or abrasion can result in loss of protection against ultraviolet degradation. Consequently the selection of coating techniques or specific stabilisers that will minimize this loss are preferred. The choice of stabilisers of low volatility can improve the retention of surface coatings of stabilisers.

The following Examples are provided to illustrate the invention.

Example 1 to 6 and 8 to 10 illustrate the vacuum deposition of a surface coating of an energy transfer agent and Example 7 is a comparative Example illustrating vacuum deposition of a surface coating of conventional absorber stabilisers. In these Examples a surface layer of the stabiliser was deposited onto the relatively cool polymer substrate by sublimation. The apparatus utilised consisted of a metal drum which rotated above a boat containing the uniformly distributed stabiliser. The drum was mounted inside a bell jar which could be evacuated to the required reduced pressure. Film samples of the polymeric substrate were attached to the outside of the drum, and could be subjected to an electrical discharge treatment if required by an electrode situated diametrically opposite the additive boat. After evacuation of the bell jar, the drum was rotated continuously at 150 r.p.m. and the boat heated to a predetermined sublimation temperature. When required, the electrode was supplied with 0.5 MHz at about 25 KV from a high frequency generator. The apparatus is essentially the same as that described for the coating of metal cans by T. Williams and M. W. Hayes in Nature 216 (1967), page 614.

EXAMPLE 1

Nickel dimethylglyoxime (NiDMG) was sublimed onto both surfaces of an unstabilised commercial polypropylene film 1 mil in thickness. The sublimation temperature was 185°C., at a pressure of 1 torr. Electrical discharge treatment of the substrate was not employed. The total stabiliser loading was calculated from the weight increase of each film. Table 1 shows a comparison of the ultraviolet stability of samples surface coated with varying loadings of NiDMG with that of an unstabilised film. Film lifetimes are expressed as hours of ultraviolet exposure in an Atlas Carbon-arc Fade-Ometer (at an ambient air temperature of 35°C.) sufficient to cause brittle failure of the sample when flexed. Unstabilised films were exposed behind the NiDMG-coated films described above. The screened unstabilised films showed only a marginal increase in ultraviolet stability when compared to a directly exposed sample of the same film as shown by the results in Table 1. This indicates that the stabilization achieved by the surface coating of NiDMG is not directly attributable to direct absorption of the incident radiation by the NiDMG.

TABLE 1

| Stabiliser Addition | Average Loading W% | Irradiated film Lifetime (hr.) | Screened film Lifetime (hr.) |
| --- | --- | --- | --- |
| None | — | 90 | 90 |
| Sublimed NiDMG | 0.3 | 450 | 95 |
| Sublimed NiDMG | 0.01 | 214 | 90 |

EXAMPLE 2

Under some conditions, the loss of stabiliser from an article by volatilisation or extraction may be important. Electrical discharge treatment can be utilised to improve the tenacity with which a coating is retained. In this Example, NiDMG layers were deposited by the technique described in Example 1, accompanied in some instances by glow discharge treatment of the surface throughout the sublimation. The ultraviolet stability of samples prepared both with and without the glow discharge treatment are compared in Table 2, together with their corresponding ultraviolet stabilities after treatment with acetone in a Soxhlet extractor for 48 hr. The initial loading was 0.05% (w/w) in all cases. As can be seen from Table 2 the glow discharge treatment improved the retention of the stabiliser.

TABLE 2

| Stabiliser | Glow discharge | Acetone Extraction | Irradiated Lifetime (hr) |
| --- | --- | --- | --- |
| None | — | — | 90 |
| Sublimed NiDMG | — | — | 375 |
| Sublimed NiDMG | — | ✓ | 149 |
| Sublimed NiDMG | ✓ | — | 350 |
| Sublimed NiDMG | ✓ | ✓ | 270 |

EXAMPLE 3

A commercial unstabilised polypropylene film was coated with 2-hydroxy-4-dodecyloxybenzophenone during a glow discharge treatment as described in Example 2. The sublimation was effected at a temperature of 156°C. under a pressure of 1.0 torr. The films were evaluated by ultraviolet exposure, as in Example 1. A significant degree of protection was observed with this coated stabiliser, as shown below:

Film A: 2-hydroxy-4-dodecyloxybenzophenone coated, 0.2% loading
— Film failed at 505 hr.

Film B: untreated, unstabilised
— Film failed at 90 hr.

EXAMPLE 4

A commercial unstabilised polypropylene film was coated with octadecyl 3-(3′,5′-di-t-butyl-4′-hydroxyphenyl) propionate (commercially available under the trade mark Irganox 1076 from Geigy Chemical Corpn.) during a glow discharge treatment as described in Example 2. The sublimation temperature was 160°C. and the pressure was 1.0 torr. The coated films had an appreciable lifetime under ultraviolet irradiation when tested as in Example 1, in comparison with unstabilised films irradiated either directly or screened by the coated film sample. The results are shown in Table 3.

TABLE 3

| Stabiliser | Average Loading W% | Film Lifetime (hr.) |
| --- | --- | --- |
| a) None | — | 90 |
| b) Irganox 1076 | 0.4 | 400 |
| c) None: screened by film (b) | — | 150 |

EXAMPLE 5

A commercial unstabilised polypropylene film was coated with nickelocene (0.2 w%) during a glow discharged treatment, as described in Example 2. The sublimation was carried out at a temperature of 105°C. under a pressure of 1.0 torr. This coated film had a lifetime of 260 hr., as measured by the method given in Example 1, in comparison to the normal lifetime of 90 hr. for the unstabilised film. When nickleocene was blended with commercial polypropylene resin and pressed into thin films, only slight improvement in ultraviolet stability was observed (140 hr. lifetime). This effect was attributed to extensive decomposition of the stabiliser at the press temperature (250°C.)

EXAMPLE 6

The stability of a polypropylene film which contains less than the normal stabiliser concentration (≈0.5%) present as a uniformly distributed blend may be materially improved by the addition of a low surface loading of the same stabiliser, or another stabiliser belonging to the energy transfer class. This effect is illustrated by the results shown in Table 4. The blended samples were prepared from an unstabilised commercial resin. The coated samples were prepared by the vacuum sublimation technique together with glow discharge treatment as described in Example 2 and the samples were evaluated by the procedure described in Example 1.

TABLE 4

| Stabiliser | Stabiliser Addition | Average Loading w% | Film Lifetime (hr.) |
|---|---|---|---|
| a) None | — | — | 90 |
| b) NiDMG | Blend | 0.01 | 242 |
| c) NiDMG | Blend + Surface coating | 0.01 } 0.01 } | 420 |
| d) NiDMG | Blend | 0.05 | 450 |

EXAMPLE 7

This Example illustrates the deficiencies of ultraviolet absorbers as surface coatings. Surface coating of stabilisers belonging to the absorber class were applied by vacuum sublimation as described in Example 1. Unstabilised films (labelled "screened film") placed behind these coated samples had considerably longer lifetimes than the directly irradiated, unstabilised control samples (cf. Example 1). One stabiliser was Tinuvin 328 (trade mark of Geigy Chemical Corpn), which is a substituted 2(2'-hydroxyphenyl)benzotriazole, and the other was p-(t-octyl)phenyl salicylate. Sublimation was carried out at a pressure of 1.0 torr. and at temperatures of 14°C. (Tinuvin 328) and 110°C. (salicylate). None of these coatings was significantly effective as a stabiliser, considering the high loadings as can be seen from Table 5. However, if merely doubling the film lifetime should be satisfactory for some purposes, then a comparison with the results of Table 1 in Example 1 will show that this degree of stabilisation can be achieved according to the invention employing only one hundredth the amount of stabilizer.

TABLE 5

| Stabiliser | Average Loading w% | Coated Film Lifetime (hr.) | Screened Film Life-Time (hr) |
|---|---|---|---|
| None | — | 95 | 95 |
| Tinuvin 328 | 0.5 | 210 | 200 |
| p-(t-octyl)phenyl salicylate | 1.0 | 210 | 120 |

Examples 8 and 9 illustrate the application of a stabiliser precursor with a subsequent reaction on the surface to give the stabiliser.

EXAMPLE 8

Commercial, unstabilised polypropylene films were coated with 2,2'-dihydroxydiphenyl sulphide by vacuum sublimation during a glow discharge as described in Example 2. Sublimation pressure and temperature was 1.0 torr. of $N_2$ and 90°C., respectively. The films were then immersed in aqueous nickel sulfate (1.0M solution) at 80°C. for 30 min. The films were evaluated by ultraviolet exposure, as in Example 1. For comparison purposes, an unstabilised film was subjected to the same aqueous nickel sulfate treatment alone. The observed lifetimes are given below:

Film A: $Ni^{II}$(2,2'-thiobisphenolate) coated (0.05 w%) — Failed at 300 hr.
Film B: $NiSO_4$ solution immersed only — " 94 hr.

EXAMPLE 9

Polypropylene film was coated with furil dioxime (sublimation temperature 170°C., sublimation pressure 1.0 torr) and subsequently immersed in aqueous nickel sulfate essentially as described in Example 8. This coated film (0.03% loading) had a lifetime of 195 hr., and an untreated film had a lifetime of 90 hr.

EXAMPLE 10

Films containing 0.5% of 2,2'-thiobis(4-t-octylphenol) $Ni^{II}$ complex (Ferro AM 101) as a blend, and 0.1% of a similar additive as a surface coating (prepared as described in Example 8) were exposed to a dyebath containing a metal chelating (mordant disperse) dyestuff (American Aniline Products, experimental dye AB-24, red-brown). The surface coated film was rapidly dyed (about 5 min. exposure) to an intense shade, whereas the film containing the blended additive reached a deep shade only after 90 min. exposure, and failed to reach the shade of the coated film, even after further prolonged exposure to the dye bath. Similar results were obtained in a comparison of the dyeability of a film containing 0.01% NiDMG as a blend, with that of a film carrying 0.01% NiDMG as a surface coating. Again a mordant disperse dyestuff was used.

Examples 11 and 12 illustrate the addition of stabilisers by diffusion. Energy transfer stabilisers may be applied by brief exposure (1 hr. or less) of an unstabilised polypropylene film to a solution of the stabiliser. The treatment time preferably should be short to prevent extensive diffusion of the stabiliser into the polymer, with associated high consumption of the stabiliser.

EXAMPLE 11

Unstabilised commercial polypropylene films were immersed in a xylene solution of 2-hydroxy-4-dodecyloxybenzophenone (3.0 w%) for 1 hour at various temperatures. The treated films were then briefly rinsed in methanol (10 seconds) and rapidly dried by exposure to a warm air blast (30 seconds at 60°C.). The stability of these films was evaluated by exposure to the Carbon-arc Fade-Ometer described in Example 1. The lifetimes of the various films are listed in Table 6.

TABLE 6

| Diffusion Period (hr) | Solution Temp. (°C.) | Average Loading w% | Film Life-Time (hr) |
|---|---|---|---|
| — | — | — | 95 |
| 1.0 | 25 | 0.05 | 245 |
| 1.0 | 40 | 0.06 | 290 |

EXAMPLE 12

Since the surface concentration of the stabilisers may be depleted by exposure to solvents, a post treatment may be required to minimize this loss. This treatment can consist of a brief exposure of the stabilised sample to a corona discharge (that is an electrical discharge treatment carried out at atmospheric pressure) in a chemically inert gas, such as nitrogen, argon or helium. Unstabilised commercial polypropylene films were treated with a solution of 2-hydroxy-4-dodecyloxybenzophenone in xylene for 30 min. at 25°C. as described in Example 11. Some films were subsequently exposed to a nitrogen corona discharge treatment on both surfaces for 50 seconds. The stability of these films both before and after acetone extraction (15 hr. in a Soxhlet extractor) is compared in Table 7. Samples treated with a corona discharge showed no decrease in stability on acetone extraction, whereas the untreated film showed almost complete loss of stabiliser.

TABLE 7

| Diffusion Period (hr) | Initial Average Loading w% | Corona Treatment | Acetone Extraction | Film Life-Time (hr) |
|---|---|---|---|---|
| 0 | — | — | — | 94 |
| 0.5 | 0.03 | — | — | 180 |
| 0.5 | 0.03 | — | ✓ | 94 |
| 0.5 | 0.03 | ✓ | ✓ | 180 |

What we claim is:

1. Thin films, fibres, and filaments of polymeric material having high surface area in relation to volume stabilized against the degradative effects of actinic radiation, which comprises said polymeric material having a continuous thin surface layer containing an energy transfer agent which is a metal coordination compound containing at least one metal atom and a ligand comprising a cyclic olefin or a ligand which contains an electron donor atom of nitrogen, oxygen or sulfur, the amount of energy transfer agent in the layer being at most 0.5% by weight based on the weight of the polymeric material.

2. Thin films, fibres and filaments according to claim 1 wherein the thickness is up to about 50 microns.

3. Thin films, fibres and filaments according to claim 1 wherein the thin surface layer is not more than 1 micron.

4. An article as claimed in claim 1, wherein the energy transfer agent is a nickel coordination compound containing a grouping of the formula:

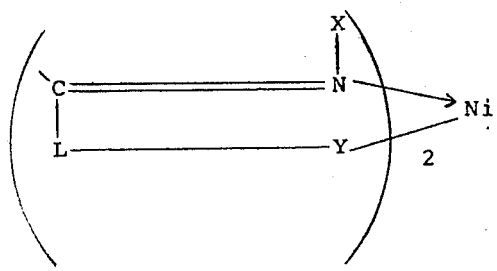

wherein X is a hydroxyl group or a hydrocarbyl group and Y is

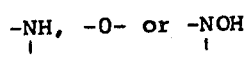

and L is a linking moiety; or a grouping of the formula:

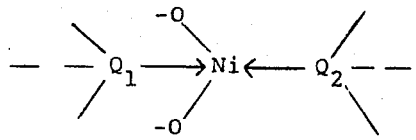

wherein $Q_1$ and $Q_2$ may be the same or different and are each S or N; or a grouping of the formula:

wherein $R_1$ and $R_2$ each represent a cyclic olefin group selected from cyclopentadiene, cyclohexa-1,3-diene, cyclohexa-1,4-diene, cycloocta-1,5-diene, cycloocta-1,3,5-triene, cyclooctatetraene, and cyclodedeca-1,5,9-triene; the amount of energy transfer agent being from 0.01% to 0.3% by weight of the polymeric material.

5. An article as claimed in claim 1, wherein the energy transfer agent is a nickel (II) complex with ligands selected from glyoxime, dimethylglyoxime, furil dioxime, 1, 2-cyclohexane-dione dioxime, 2, 2'-dihydroxyphenyl sulphide, 2,2'-thiobis (4-tert-octylphenol), n-butylamine, 2-hydroxy-5-methoxyphenyl N-(n-butyl)aldimine, 2-hydroxy-1-naphthyl N-(n-butyl)aldimine and cyclopentadiene.

6. An article according to claim 1, wherein the polymeric material is formed of a polyolefin.

7. An article according to claim 1, wherein the polymeric material is formed of polypropylene.

8. An article as claimed in claim 1 wherein the energy transfer agent is distributed through the thin surface layer.

9. An article as claimed in claim 1 wherein the energy transfer agent is deposited upon the polymeric material to form said continuous thin surface layer.

10. A process for preparing thin films, fibres and filaments of polymeric material having high surface area in relation to volume stabilised against the degradative effects of actinic radiation, which comprises distributing through substantially only a continuous thin surface layer of said polymeric material an energy transfer agent which is a metal coordination compounds, containing at least one metal atom and a ligand comprising a cyclic olefin or a ligand which contains an electron donor atom of nitrogen, oxygen or sulfur, the amount of energy transfer agent in the layer being at most 0.5% by weight based on the weight of the polymeric material.

11. A process according to claim 10 wherein the energy transfer agent is a nickel coordination compound containing a grouping of the formula:

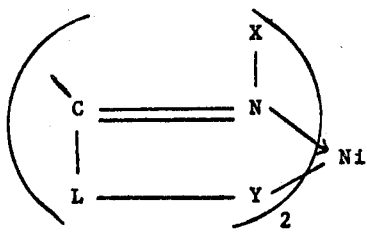

wherein X is a hydroxyl group or a hydrocarbyl group, Y is $-NH$, $-O-$ or $-NOH$ and L is a linking moiety; or a grouping of the formula:

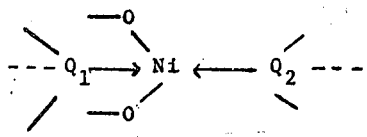

wherein $Q_1$ and $Q_2$ may be the same or different and are each S or N; or a grouping of the formula:

$$R_1 - Ni - R_2$$

wherein $R_1$ and $R_2$ each represent a cyclic olefin group selected from cyclopentadiene, cyclohexa-1,3-diene, cyclohexa-1,4-diene, cycloocta-1,5-diene, cycloocta-1,3,5-triene, cyclooctatetraene, and cyclododeca-1,5,9-triene; the amount of energy transfer agent being from 0.01% to 0.3% by weight of the polymeric material.

12. A process according to claim 11, wherein the energy transfer agent is a nickel (II) complex with ligands selected from glyoxime, dimethylglyoxime, furil dioxime, 1,2-cyclohexanedione dioxime, 2,2'-dihydroxyphenyl sulphide, 2,2'-thiobis (4-tert-octylphenol), n-butylamine, 2-hydroxy-5-methoxyphenyl N-(n-butyl) aldimine, 2-hydroxy-1-naphthyl N-(n-butyl) aldimine and cyclopentadiene.

13. A process according to claim 10, wherein the energy transfer agent is diffused into the polymeric material surface by immersing the material in a solution of the energy transfer agent.

14. A process according to claim 10, wherein said thin films, fibers and filaments have a maximum thickness of about 50 microns.

15. The process of claim 10 wherein said energy transfer agent distribution is produced by migration to the surface during extrusion.

16. An article stabilised against the degradative effects of actinic radiation, which comprises a polymeric substrate having a maximum thickness of about 50 microns and having distributed through substantially only a continuous thin surface layer thereof an energy transfer agent which is a metal coordination compound containing at least one metal atom and a ligand comprising a cyclic olefin or a ligand which contains an electron donor atom of nitrogen, oxygen or sulfur, the amount of energy transfer agent in the layer being at most about 0.5% by weight based on the weight of the polymeric substrate.

17. A process for preparing thin films, fibres and filaments of polymeric material stabilised against the degradative effects of actinic radiation comprising, depositing on the surface of said polymeric material an energy transfer agent which is a metal coordination compound, containing at least one metal atom and a ligand comprising a cyclic olefin or a ligand which contains an electron donor atom of nitrogen, oxygen or sulfur, the amount of energy transfer agent in the layer being at most 0.5% by weight based on the weight of the polymeric material.

18. A process according to claim 17, wherein the energy transfer agent is deposited on the polymeric material by sublimation at subatmospheric pressure.

19. A process according to claim 17, wherein the surface of the polymeric material is activated by exposure to an electrical discharge before or after the energy transfer agent is deposited thereon.

20. A process according to claim 17, wherein the surface of the polymeric material is activated by treatment with an oxidising flame or chemical before or after the energy transfer agent is deposited thereon.

21. A process according to claim 17, wherein a nickel-free precursor of the energy transfer agent is deposited on the polymeric material and thereafter converted to the energy transfer agent by treatment with a nickel-containing reagent.

22. A process according to claim 17 wherein the energy transfer agent is a nickel coordination compound containing a grouping of the formula:

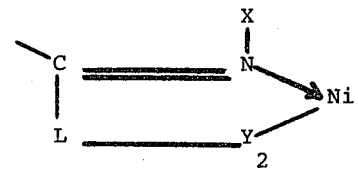

wherein X is a hydroxyl group or a hydrocarbyl group, Y is $-NH$, $-O-$ or $-NOH$ and L is a linking moiety; or a grouping of the formula:

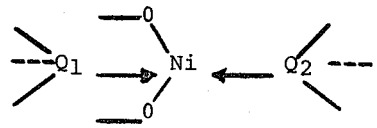

wherein $Q_1$ and $Q_2$ may be the same or different and are each S or N; or a grouping of the formula:

$$R_1 - Ni - R_2$$

wherein $R_1$ and $R_2$ each represent a cyclic olefin group selected from cyclopentadiene, cyclohexa-1, 3-diene, cyclohexa-1, 4-diene, cycloocta-1, 5-diene, cycloocta-1,3,5-triene, cyclooctatetraene, and cyclododeca-1,5,9-triene; the amount of energy transfer agent being from 0.01% to 0.3% by weight of the polymeric substrate.

23. A process according to claim 22, wherein the energy transfer agent is a nickel (II) complex with ligands selected from glyoxime, dimethylglyoxime, furil dioxide, 1, 2-cyclohexanedione dioxime, 2,2'-dihydroxyphenyl sulphide, 2,2'-thiobis (4-tert-octylphenol), n-butylamine, 2-hydroxy-5-methoxyphenyl N-(n-butyl) aldimine, 2-hydroxy-1-naphthyl N-(n-butyl) aldimine and cyclopentadiene.

24. A process according to claim 17, wherein said polymeric material has a maximum thickness of about 50 microns and the amount of energy transfer agent in the substrate layer is at most about 0.5% by weight based on the weight of the polymeric material.

* * * * *